Patented Nov. 4, 1947

2,430,435

UNITED STATES PATENT OFFICE 2,430,435

PREWELDING CLEANING OF ALUMINUM

Lyman B. Sperry, Detroit, Mich., assignor to Chrysler Corporation, Highland Park, Mich., a corporation of Delaware No Drawing. Application September 10, 1942, Serial No. 457,873

5 Claims. (Cl. 134—3)

This invention relates to an improved composition and process for treating aluminum preparatory to welding it. More particularly the invention pertains to an improved process and composition for treating sheet aluminum in order to condition it for receiving a spot welding operation.

One of the main objects of the invention is to provide a treatment of this character which removes the aluminum oxide from aluminum parts to be welded together without forming thereon any compounds which hold the parts from metal to metal contact or which result in the presence of a high electrical resistance strata between the aluminum parts during welding operations.

Another object of the invention is to reduce sputtering between adjacent surfaces of superimposed aluminum parts during electric welding, by obviating the excessive heat which results from the electrical resistance produced by the films of aluminum oxide normally present on the surfaces of aluminum sheet and other parts.

A further object of the invention is to prevent sticking of the electrodes to the external surfaces of superimposed aluminum parts during welding operations by obviating excessive heat at such locations produced by the electrical resistance of the films of aluminum oxide normally present on the external surfaces of assemblies of such parts.

A still further object of the invention is to reduce deformation of the aluminum as well as of the contact ends of the electrodes by heat produced by resistance caused by aluminum oxide films.

An additional object of the invention is to provide an oxide removal treatment for aluminum which is not critical as to time and which deters the reformation of aluminum oxide on the parts to be welded for sufficient time to accommodate usual delays between preparation and welding operations.

I found that the foregoing and other objects may be accomplished during the preparation of sheet aluminum and other aluminum parts to receive welding operations by initially cleaning the aluminum surfaces on the sides of the parts which are to be placed together as well as on their opposite sides with which electrical contact is normally made during spot and other electrical welding operations, in order to remove all grease and other foreign matter which may be removed by degreasing and conventional detergent agents. The cleaned surfaces are then thoroughly rinsed with water and treated with a deoxidizing solution which is adapted to retard reformation of aluminum oxide. This solution preferably comprises oxalic acid which serves to remove the aluminum oxide and sodium nitrate which delays the reformation of aluminum oxide. A wetting agent may be used to advantage for the purpose of reducing the surface tension of the solution in order that all portions of the metal surface to which it is applied, may be uniformly wetted. The deoxidizing solution may be applied by dipping, spraying, with a brush or in any other suitable manner. The solution is allowed to remain on the surface being treated until the aluminum content thereof has been reduced to a desired extent and the pieces of aluminum are then thoroughly rinsed and dried preferably by blowing an air stream thereon. Aluminum sheet or other parts so treated are then adapted to be arranged with portions thereof in superimposed relation and subjected to electrical welding operations such as spot welding.

While numerous cleaning and degreasing agents may be employed in the first step of the preparation of aluminum to receive welding operations, well-known aluminum cleaners such as sodium metasilicate, trisodium phosphate and sodium carbonate may be used to advantage in this step of the process. Cleaning at this stage, is continued until the surfaces are free from water break.

The composition of the deoxidizing solution may vary within relatively wide limits. A solution in water ranging from 4 ounces to 8 ounces per gallon of oxalic acid, and 2 ounces to 6 ounces per gallon of sodium nitrate has been found to serve well in both removing the aluminum oxide present on the parts to be welded as well as delaying the reformation of aluminum oxide thereon. It is preferable to use a deoxidizing and oxidation retarding solution containing 6 ounces of oxalic acid and 4 ounces of sodium nitrate per gallon of water. Any suitable wetting agent which is stable in an acid solution may be added in sufficient quantity to assure thorough and uniform wetting of the metal surface to which the solution is applied. Less powerful wetting agents which have the property of reducing the surface tension of water solutions and which are stable in acid solutions, may be used in proportionately larger quantities.

The foregoing preparatory treatment of aluminum for receiving welding operations serves to reduce the electrical resistance between the parts so as to obviate the creation of excessive heat and the resulting sputtering of molten aluminum from between the parts. This reduction in excessive heat at the strata between the parts also prevents deformation of the structure particularly in welding sheet aluminum. Removal of the oxide and the delaying of reformation thereof on the external sides of an assembly of aluminum parts obviates the generation of excessive heat at the tip ends of the electrodes used in spot welding and other electrical welding operations, thereby greatly increasing the life of the electrodes and safeguarding the external surface of the aluminum parts from injury of the nature of deformation and scarring.

Although but several specific embodiments of the invention are herein shown and described, it will be understood that various changes in the sequence of operations, steps and materials employed may be made without departing from the spirit of the invention.

I claim:

1. A composition for treating aluminum surfaces preparatory to welding them together consisting of a solution in water of approximately 6 ounces per gallon of oxalic acid and 4 ounces per gallon of sodium nitrate and a wetting agent stable in acid solutions.

2. The method of reducing sputtering between sheets of aluminum having overlapped surface portions during spot welding of said sheets which comprises the steps of removing the aluminum oxide from said surface portions by treating them with a water solution having a solute consisting of from substantially four ounces to eight ounces per gallon of oxalic acid and two ounces to six ounces per gallon of sodium nitrate and having a wetting agent therein stable in acid solution, rinsing said surface portions thereafter and drying the resulting deoxidized surfaces.

3. The method of reducing the electrical resistance between overlapped portions of aluminum sheets and between each sheet and a contacting electrode during spot welding of said overlapped portions which comprises the steps of deoxidizing said surfaces by applying thereon a water solution having a solute consisting of substantially 6 ounces per gallon of oxalic acid, 4 ounces per gallon of sodium nitrate and a wetting agent stable in acid solution comprising a sodium salt of sulphonated alcohol, rinsing said surface portions thereafter with water, and drying the resulting deoxidizing surface portions.

4. A solution for simultaneous deoxidizing and delaying reoxidation of surfaces of aluminum pieces preparatory to a welding operation comprising a water solution having a solute consisting of a major portion of oxalic acid amounting to from approximately four ounces to eight ounces per gallon and a minor portion of sodium nitrate, the sodium nitrate content of said solution being from approximately one-half to three-fourths by weight of the oxalic acid content thereof.

5. A solution for simultaneous deoxidizing and delaying reoxidation of surfaces of aluminum pieces preparatory to a welding operation comprising a water solution having a solute consisting of from substantially 4 ounces to 8 ounces per gallon of oxalic acid and from substantially 2 ounces to 6 ounces per gallon of sodium nitrate, and a wetting agent stable in acid solutions in said solution.

LYMAN B. SPERRY.

REFERENCES CITED

The following references are of record in the file of this patent:

UNITED STATES PATENTS

| Number | Name | Date |
|--------|------|------|
| 1,954,744 | Peterson | Apr. 10, 1934 |
| 2,070,487 | Lutz | Feb. 9, 1937 |
| 1,554,483 | Bailey | Sept. 22, 1925 |
| 590,966 | Cornwall | Oct. 5, 1897 |
| 1,890,214 | Churchill | Dec. 6, 1932 |
| 1,954,745 | Peterson et al. | Apr. 10, 1934 |

OTHER REFERENCES

Spraragen et al., "Resistance Welding Aluminum and Its Alloys," A review of the Literature to Jan. 1, 1939, Supplement to the Journal of the American Welding Society, July, 1940. Pages 241-S to 280-S (particularly pages 247-S and 248-S, "Chemical Preparation." (Copy in Sci. Lib.) 219-10(48).

"Spot Welding Aluminum Alloys," Dec., 1941, P. R. Mallory & Co., Inc., Indianapolis, Ind. (12 pages, particularly page 12) 219-10(48).